May 28, 1935.   C. O. CAREY   2,003,245
DEVICE FOR RESTORING THE LAY TO TWISTED TEXTILE LINES
Filed June 20, 1934
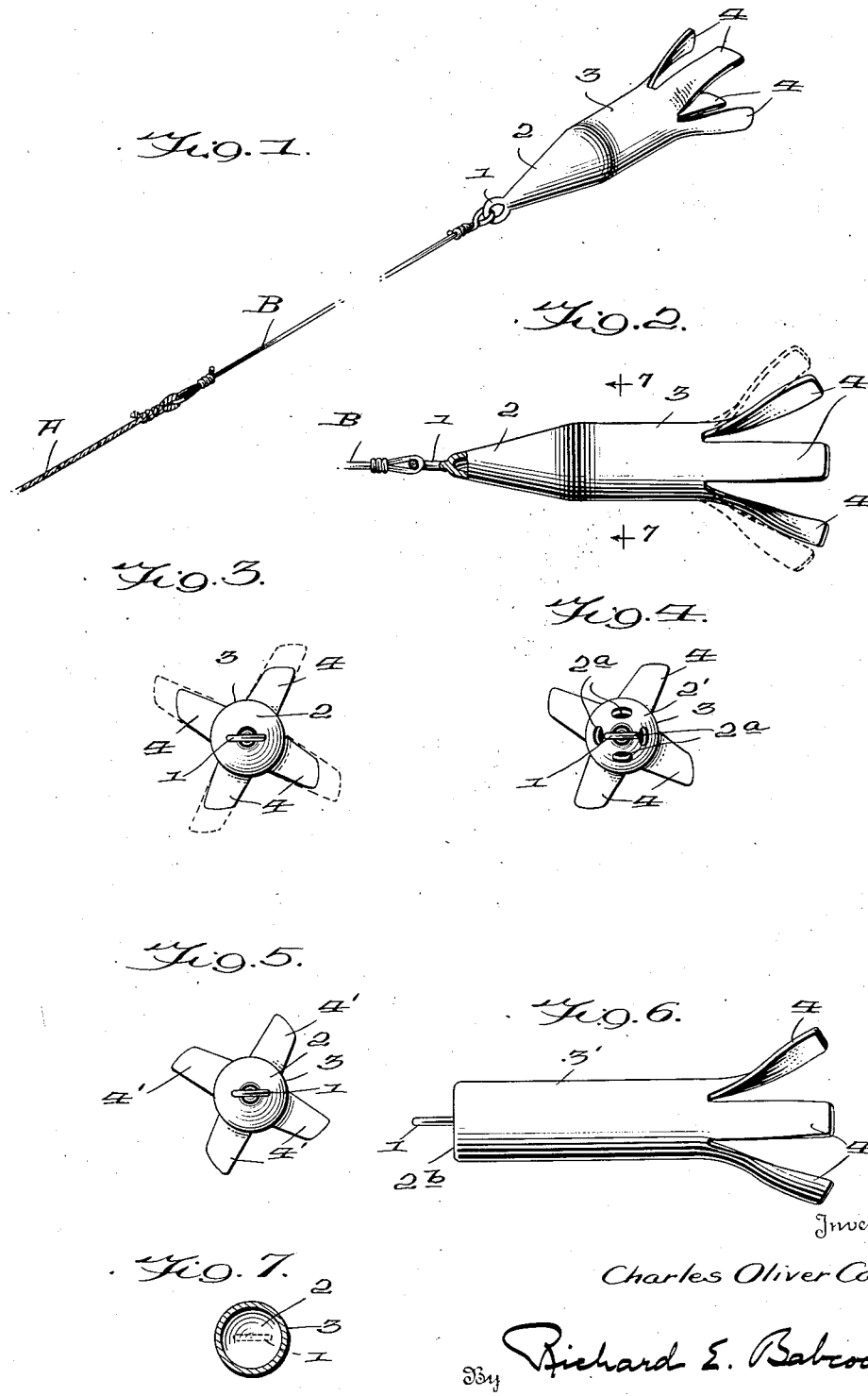

Patented May 28, 1935

2,003,245

UNITED STATES PATENT OFFICE 2,003,245

DEVICE FOR RESTORING THE LAY TO TWISTED TEXTILE LINES

Charles Oliver Carey, Miami, Fla.

Application June 20, 1934, Serial No. 731,557

5 Claims. (Cl. 117—1)

This invention relates to devices for use in retwisting textile lines and is primarily intended for use by fishermen for putting the lay back into, or retwisting, a partially untwisted fishing line, although it is not limited to such use but may be made in suitable sizes for use in retwisting any twisted type textile line from the smallest size fishing line to a large manila hawser or towing rope or line.

In fishing, when a line is used for trolling, even though the bait is attached by a swivel, there is not infrequently a certain amount of twist of the unreeled portion of the line, and if the bait is so cut or formed that the direction of such twisting action is the reverse of, or opposed to, the normal twist of the line such twisting action results in a partial untwisting of the unreeled portion of the line, and repeated or continued use of the line and bait or "spoon" under these conditions will result in the unreeled portion of the line becoming so completely untwisted, or losing its "lay" as to lose a great deal of its tensile strength, becoming so defective and unreliable that heretofore it has been usual practice simply to cut off the defective portion and unreel a further length. In some waters it is usual practice to use approximately one hundred feet of line for normal trolling purposes with an initial reserve of from four to five hundred feet of reserve line on the reel for use in "playing" a catch in case of need. After two or three normal trolling lengths of one hundred feet have successively become defective by reason of becoming untwisted or losing their lay and have for this reason been cut off, the remaining total length of line is too short to use so that it is necessary to cast aside the remaining otherwise non-defective portion of the line and start afresh with a new full length line, a rather expensive practice.

The present invention has been developed with the above considerations in mind and has for its primary object to provide a simple device which may be attached to a defective line, dropped with the end of the line into the water and which by being pulled by the line through the water will be given a whirling or rotary movement in the direction of the normal twist of the line, and will cause the unreeled portion of the line to be given a twisting movement in the same direction, to retwist the line or restore the lay to the line, the line being pulled through the water in either of several suitable and convenient ways, or, with said device attached to it, being subjected to the action of a strong water current, or being subjected to both of these actions. Further objects are to provide a device which will create a partial vacuum in the water thus increasing its pull on the line and promoting the efficiency and speed of the device in retwisting the line; to provide means on such a device for causing rotary movement thereof as the device is subjected to the action of the water, which means may be spread or contracted by hand to vary the pull of the device and the speed of its rotation in approximate relation to the size and strength of the line being treated, and which means also may be bent or twisted by hand or with the aid of a pocket knife or pair of pliers to reverse the direction of rotation of a particular device according as may be made necessary by the direction of normal twist of the particular line to be treated; and to provide a very simple inexpensive device which in its smaller size embodiments is suitable for use in retwisting ordinary fishing lines, may be formed by usual and well known metal drawing and stamping operations from ordinary suitable light weight sheet metal and suitably plated or treated to prevent or retard corrosion, or may be made entirely of non-corrodible material.

In the accompanying drawing:

Figure 1 represents a perspective view of a device embodying my invention as attached to a defective section of fishing line preparatory to retwisting the same;

Figure 2, a side elevation thereof, the blades 4 or fins being shown in solid lines in one position and in dotted lines in a position as spread by hand to suit the device for more efficient use with a heavier line;

Figure 3 a front end elevation of the device with the blade or fins 4 illustrated in positions corresponding to those of Fig. 2;

Figure 4, a view corresponding to Fig. 3, of a modified form;

Figure 5, a view corresponding to Fig. 4, of a further modification;

Figure 6, a view corresponding to Fig. 2, of a further modified form; and

Figure 7, a sectional view on the line 7—7 of Figure 2, looking in the direction of the arrows.

In the accompanying drawing Figures 2, 3 and 7 are made to a scale twice actual size from an actual full size commercial device. Also, while several slightly different embodiments have been illustrated, all embodiments so illustrated are primarily intended for use with fishing lines and accordingly are shown as of light weight stamped sheet metal, but obviously the larger and heavier sizes suitable for use in retwisting ropes of various sizes may be made in the same form but of such larger size or sizes as may be required by the conditions of use they must meet and may be produced by various manufacturing methods as by sheet metal drawing and stamping operations, casting or forging, and may be formed either as an integral piece or of a number of pieces, welded, riveted, bolted or otherwise suitably secured together by any well known and usual means or method and may be either solid or hollow, it being observed that the larger sizes for use in retwisting hawser and tow line ropes will probably be heavy castings or forgings with the bodies probably solid and the fins or blades may very well in such case be formed separately and secured in place by bolts in such manner as to be removable or interchangeable with other similar blades or fins reversely formed to adapt the device for use in retwisting in either direction.

Referring now in detail to the drawing, 1 designates the attaching eye of the device rigid, and preferably integral, with the conical nose 2 which merges with the preferably cylindrical body portion 3, said nose 2 and body 3 preferably being hollow and preferably being integral with each other. The rear end portion of the body 3 is longitudinally slitted or slotted to form a plurality of preferably integral preferably equidistantly spaced rear fins or blades 4, four such blades or fins being illustrated, which blades or fins 4 are bent outwardly to substantially the same degree and are each twisted lengthwise in the same direction and to approximately the same degree, whereby said blades 4 together constitute with the connecting portion of the body 3 a screw-type propeller for causing the rotation of the device as a whole about its axis, or means for causing the rotary motion of the device as a whole. In the smaller embodiments of the invention as primarily designed for use with fishing lines said blades 4 will be bent outwardly or flared to such degree and twisted to such degree as to suit them for use with the most popular weight or size of fishing line, without change or adjustment, but preferably will be so formed and of such size and of such nature and weight of material so connected with the cylindrical body 3 that they may be spread further apart by hand, for instance to the dotted line positions indicated in Figures 2 and 3, to increase the resistance of the device to the pull of the line to better adapt the device for use with a heavier line, or similarly may be compressed toward each other to decrease such resistance to better adapt the device for use with a lighter line, and so that the degree of twist of the individual blades 4 may be increased or decreased by hand, or may be reversed by hand to better suit the device for use with a particular weight of line, or as may be made necessary by the direction of normal twist of a particular line to be treated.

It is believed that by making the nose 2 and body 3 hollow and of unbroken area with the rear end of said body 3 open, the action of pulling the device through the water results in the creation of a partial vacuum in the interior of said body or of the device, which partial vacuum is opposed to the pull of the line, thus increasing the resistance of the device to the pull of the line, resulting in holding the line more taut and increasing the speed of rotation of the device. However, while this hollow construction is preferred it is not essential, similarly, while the closed or unbroken area construction of the nose and the body, except for its open rear end, resulting in such vacuum action, is preferred it is not essential.

In the modification illustrated in Figure 4 the construction and operation are the same as above described with relation to the preferred form illustrated in Figures 1, 2, 3 and 7, except that in place of the conical nose 2, the embodiment of said modification illustrated in Figure 4 is formed with a conical nose 2' having therein a plurality of openings 2$^a$, four being illustrated, establishing communication between the exterior and interior of said nose 2', from which it follows that there would be no vacuum action incident to the use of this modified form of the device.

The modified form of device illustrated in Figure 5 is the same as the preferred form illustrated in Figures 1, 2, 3 and 7 and above described, except that the fins or blades 4' are twisted in the direction reverse to the direction illustrated in the preferred form, whereby this modified form of Figure 5 will rotate in a direction reverse to the direction of the preferred form. While Figure 5 has been referred to as a modification and while the invention might be put out commercially in these two initial forms, Figure 5 might also be said to be a front elevation of the preferred form after the blades or fins have been adjusted or twisted by hand to reverse twist position to reverse the direction of rotation of the device to adapt it to retwist a particular line, the direction of normal twist of which requires such reverse position of the blades or fins.

In the modification illustrated in Figure 6, the construction and operation are the same as in the preferred form, except that a flat, square or blunt front or nose 2$^b$ is substituted for the conical nose 2, and the body 3 is substituted by a cylindrical body 3' approximately as long as the nose 2 and body 3 together of the preferred form, also the body 3' of this modified form may be either hollow or solid.

It is essential to the invention that the eye or equivalent 1 and the blades or fins 4 or 4' be integral with each other to turn together, or so related, associated or connected with each other that as said blades are rotated by the action thereon of the water they will cause the eye 1 or equivalent to rotate in the same direction. Given the above essential relationship, it is immaterial, considering the invention in its broader aspects, whether the eye or equivalent 1 be integral with, or rigid with, the nose 2, or 2' or 2$^b$, or be connected thereto to turn therewith, and the same remarks apply as to the relation between the nose 2 and cylindrical body portion 3 of the preferred form and modified form of Fig. 5, or the nose 2' and body portion 3 of Fig. 4, or the nose 2$^b$ and body portion 3' of Fig. 6, and also as to the relation between the body portion 3 and blades 4 of the preferred form and of the modified form of Fig. 4, or the body portion 3 and blades 4' of Fig. 5, or the body portion 3' and blades 4 of Fig. 6, although considering the invention less broadly and from a more detail viewpoint the integral construction of the eye 1, nose and body portion, and, more narrowly of the eye, nose, body and blades or fins is an important consideration as resulting in a very simple, efficient, sturdy and durable device capable of manufacture very economically on a large quantity production basis and admirably suited for use in retwisting fishing lines.

When the device is to be used in waters frequented by large fish generously provided with teeth as is the case in Florida and other tropical waters, it is advisable to use a steel or other metal rod or leader B, which may be six inches, or a foot or more long, connected at its rear end to the eye 1 of the device to turn therewith and connected at its forward end to the rear end of the line A so that the two latter will turn together, otherwise a large fish may strike at the device the same as at any bait, cut the line in front of the device and make off with it. However, in waters where there is no such risk, or in case the user elects to run the risk of thus losing the device, the textile line may be threaded through the eye 1 and tied thereto in a loop in exactly the same manner as is illustrated with relation to the wire B in Figures 1 and 2, so that the rod or wire B is merely a safeguard against the loss of the device, but does not modify or affect the operation of the device nor form any part of the device, but on the contrary functions as a reinforced part of the line, thus as a part of the line, which word as used in the claims is to be understood as covering either an entirely textile line or a textile line with a length of steel rod or metal wire B attached to the end of the textile portion and interposed between said textile portion and the rewinding device for loss preventing purposes.

With the rear end of the wire B looped through eye 1 to turn therewith as illustrated in Figures 1 and 2 and the end of the textile portion A of the line looped through the forward end loop of wire B and tied or otherwise so secured that said textile portion A will turn with wire B, or, in case the wire B is not used as part of the line, with the end of textile line A threaded through eye 1 of the device and tied or otherwise so secured that line A will turn with the eye 1 and blades 4, the device is dropped into the water and the defective portion of the line to be retwisted is unreeled, after which the line with the device attached thereto may be allowed to trail behind the boat as in trolling, the movement forward of the boat under influence of its sails or engine, serving to pull the device through the water which in acting on the blades 4 causes the device to rotate, the speed of rotation depending on, and varying with, the speed of forward movement of the boat, and also on the degree of twist and degree of spread or contraction of the blades or fins 4 and the resistance of the device to the pull of the line A, the treatment being continued until the line is retwisted to its initial condition, in other words, until the lay has been restored to the line. It is contemplated, of course, that with such a device available it will be used with such reasonable frequency as will prevent a line from becoming badly untwisted, recourse being had to the use of the device at the first indication of slight defect in twist, so that with lines once in good condition its use thereafter for a short time on a line will serve to restore the same to its initial condition.

Instead of letting the line trail as in trolling, the line may be unreeled for a considerable length in addition to the defective portion, and then reeled in to the defective portion, and this operation repeated until the line has been retwisted in its theretofore defective portion incident to the rotation of the device in the water under the pull of the line as the same is being reeled in.

Or, instead of such simulated trolling procedure, if a swift flowing body of water or current of water is available as in a mill-race, fast flowing river, or mountain stream, the defective part of the line may be unreeled into the water with the device attached to its end. In this case the water would flow by and act on the blades 4 of the device, instead of the device being pulled through the water, but the net result of rewinding of the line would be the same, although it might take a little longer, depending on the rate of flow of the water.

Having thus described my invention, what I claim as new and desire to secure by Letters Patent is:

1. A device for use in a body of water in retwisting partially untwisted normally twisted textile lines to restore the lay thereto, said device comprising a hollow cylindrical body of unbroken area having an open end, a hollow conical nose of unbroken area integral, and merging at its rear and point of greatest diameter, with said body, and an attaching eye integral with the forward tip of said nose for connection with the end portion of a textile line to turn therewith, the point of engagement between said line and eye being substantially in line with the axis of said device as a whole, and the hollow interiors of said nose and body being in communication and functioning to create a partial vacuum to increase the resistance of the device in the water in opposition to the pull of the line to which it is attached to thereby hold said line more taut and increase the speed of rotation of the device, in combination with a plurality of screw-type propeller blades integral with and extending from the rear edge of said body and adapted to be acted upon by the water as the device is pulled therethrough to cause rotation of said device, said blades being of such size and material and so connected to said body that they may by hand be spread apart or pressed toward each other or individually twisted to change their degree of, or to reverse the direction of their, twist.

2. A device for use in a body of water in retwisting partially untwisted normally twisted textile lines to restore the lay thereto, said device comprising a hollow cylindrical body, a conical nose merging at its point of greatest diameter, and being integral, with said body, and an attaching eye integral with the forward tip of said nose for connection with the end portion of a textile line to turn therewith, the point of engagement between said line and eye being substantially in line with the axis of the device as a whole, in combination with a plurality of screw-type propeller blades integral with said body and adapted to be acted upon by the water as the device is pulled therethrough to cause rotation of said device, said blades being of such size and material and so connected to said body that they may by hand be spread apart or pressed toward each other or individually twisted to change their degree of, or to reverse the direction of their, twist.

3. A device for use in a body of water in retwisting partially untwisted normally twisted texile lines to restore the lay thereto, said device comprising a hollow body, and an attaching eye integrally connected with the forward portion of said body for connection with the end portion of a textile line to turn therewith, the point of engagement between said line and eye being substantially in line with the axis of said body, in combination with a plurality of propeller blades integral with said body and adapted to be acted upon by the water as the device is pulled therethrough to cause rotation of the device, said blades being of such size and material and so connected to said body that they may be spread apart or pressed toward each other or individually twisted to change their degree of, or to reverse the direction of their, twist.

4. A device for use in a body of water in retwisting partially untwisted normally twisted textile lines to restore the lay thereto, said device comprising means for connection with the end portion of a textile line to turn therewith, in combination with a blade connected with said means to turn therewith and extending as a direct continuation of the surface of said means and adapted to be acted upon by the water as the device is pulled therethrough to cause rotation of said means.

5. A device for use in a body of water in retwisting partially untwisted normally twisted textile lines to restore the lay thereto, said device comprising means for connection with the end portion of a textile line to turn therewith, in combination with blades integral with said means and adapted to be acted upon by the water as the device is pulled therethrough to cause the rotation of said means.

CHARLES OLIVER CAREY.